No. 675,133. Patented May 28, 1901.
A. JANSSENS.
TRANSMITTING GEAR.
(Application filed Aug. 21, 1900.)

(No Model.) 2 Sheets—Sheet 2.

Witnesses

Inventor

UNITED STATES PATENT OFFICE.

ANTOINE JANSSENS, OF ST. NICOLAS, BELGIUM.

TRANSMITTING-GEAR.

SPECIFICATION forming part of Letters Patent No. 675,133, dated May 28, 1901.

Application filed August 21, 1900. Serial No. 27,574. (No model.)

*To all whom it may concern:*

Be it known that I, ANTOINE JANSSENS, a subject of the King of Belgium, residing at St. Nicolas, (Flandre Orientale,) in the Kingdom of Belgium, have invented certain new and useful Improvements in Transmitting-Gear, of which the following is a specification.

The present invention relates to apparatus for transmitting motion at variable speed, and more particularly to that class in which a roller is shifted against two cones which have parallel axes, but are placed in such a manner that the apex of one cone corresponds with the base of the other cone.

The invention has for its object to remedy certain defects of the transmitting-gear heretofore encountered by permitting the use of rollers of convenient diameter corresponding to the power to be transmitted by the mechanism. At the same time the invention enables the constructor to double the number of points of contact without difficulty and to balance as completely as possible the strains acting on the principal parts of the transmitting device.

My invention chiefly consists in using one or preferably two rollers the axles of which are arranged parallel and symmetrically right and left of the plane passing through the axes of the cones, each axle being held by a movable arm forming part of suitable shifting or adjusting device situated in the plane which passes through the axes of the cones. In this manner I obtain four contacts or points of application, and I may, therefore, by combining with the rollers elastic rims, produce on the cones arcs of contact as large as may be desired or as may be required by the special conditions under which the transmission-gear is working.

The accompanying drawings show, by way of example, in what manner my invention may be applied.

Figure 1:
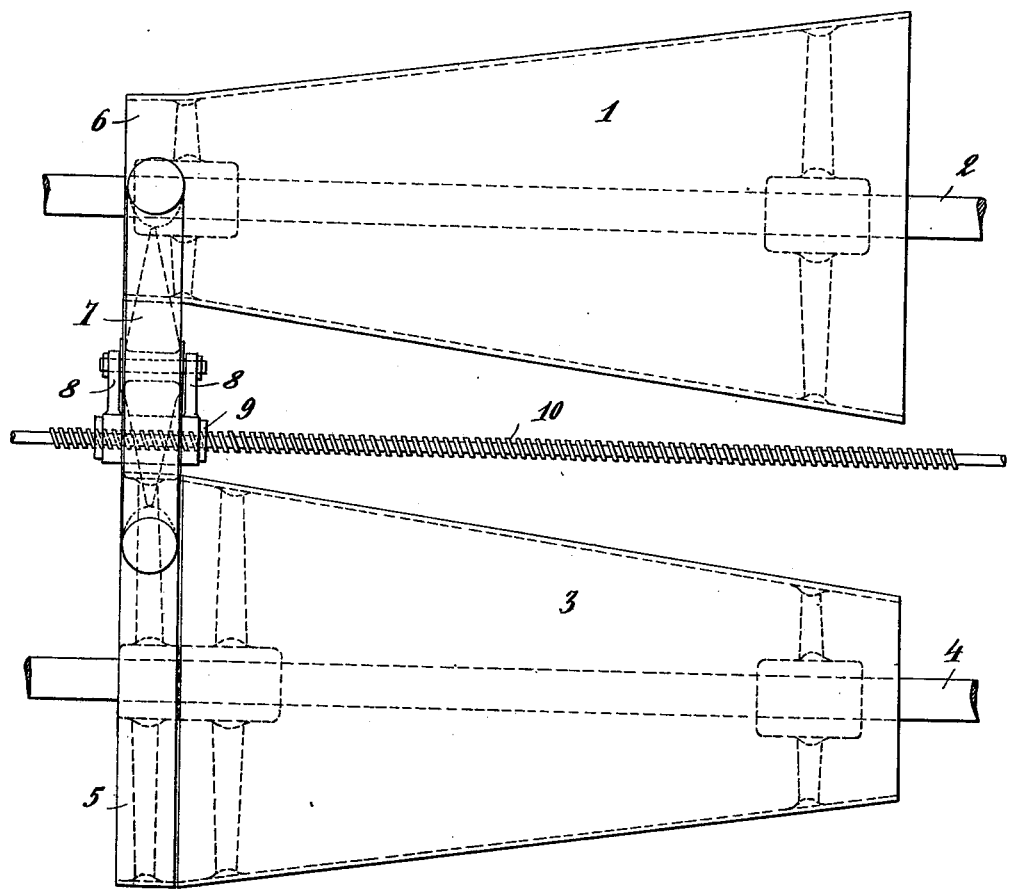
Figure 2:
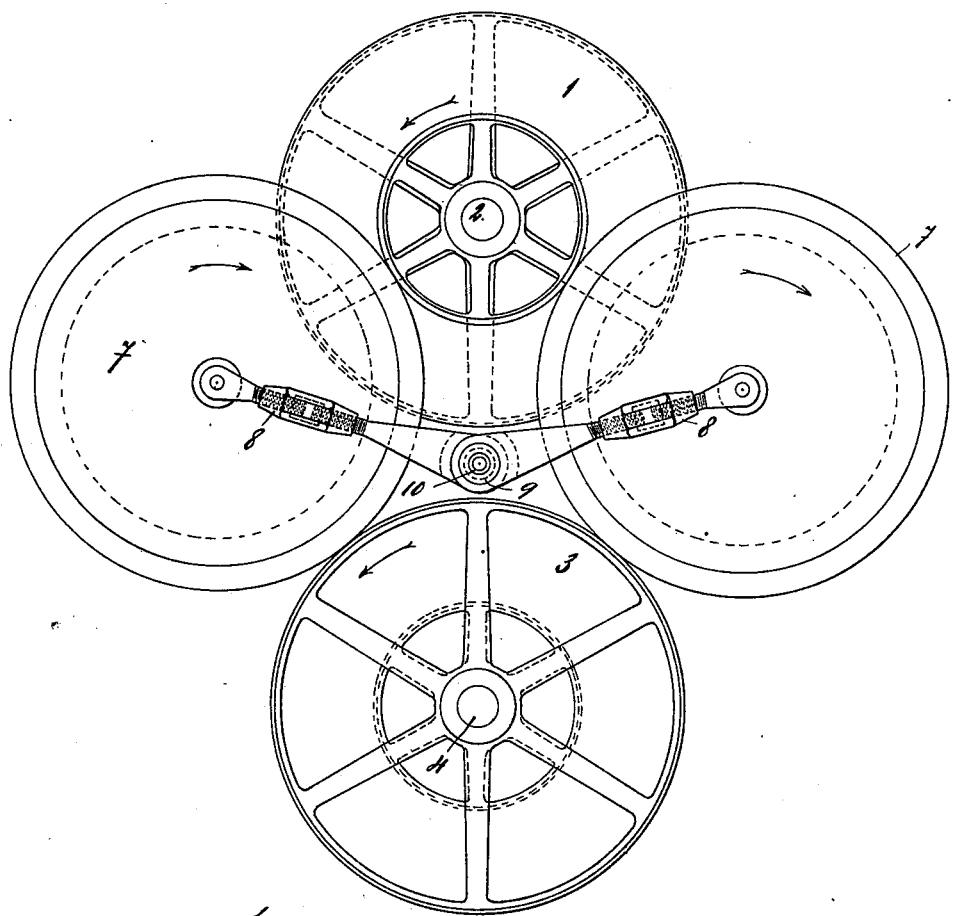
Figure 3:
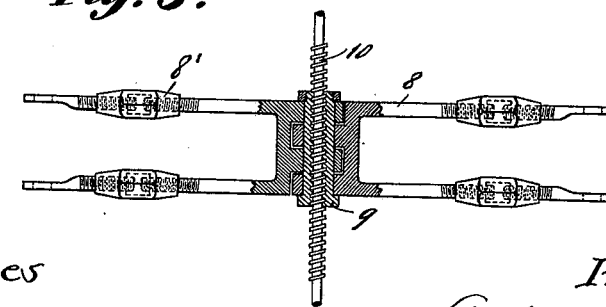

Figure 1 is a side view of a transmitting mechanism embodying my invention. Fig. 2 is an end view of the mechanism when out of action. Fig. 3 is a detail view of the supporting-axle for the rollers.

As will be seen from the drawings, the power-transmitting mechanism, like other mechanisms of this kind, chiefly comprises a cone 1, set in motion by the shaft 2, and a cone 3, which transmits to the shaft 4 the motion received from the cone 1. One of the cones may have at one end a cylindrical pulley 5 loose on its axle and serving to set the mechanism out of action. In this case the corresponding extremity of the other cone terminates in a cylindrical part 6.

According to my invention power is transmitted from one cone to the other by means of two rollers 7, the axes of which are parallel to each other and arranged symmetrically on opposite sides of the plane passing through the axes of the shafts 2 and 4 of the cones 1 and 3. Each of these rollers is supported by a forked arm 8. These forked arms, which may be lengthened and shortened by means of a screw-coupling 8', so as to regulate the pressure of the rollers 7 upon the cones 1 and 3, are capable of oscillating on an axis 9, parallel with those of the rollers, thus allowing the rollers to follow the inclination of the cones 1 3 and to maintain upon the latter a uniform pressure no matter at what point of the cones the contact may take place.

The pivot of the forked arm 8 may be formed by a screw-rod 10.

The disengagement and reëngagement of the rollers and their regulation may be effected by any suitable mechanism, either by causing the rollers to approach each other and to move apart, as required, or by causing the cones to approach each other or to recede from each other.

As mentioned above, the rims of the rollers are preferably elastic, so as to increase the surface of contact between the rollers 7 and the cones 1 3, and consequently to increase the adhesion or friction between the same.

For setting the shaft 4 in motion the forked arms 8 are caused to advance from the place which they occupy in front of the loose pulley 5 toward the right, Fig. 1. In the original positions of the rollers no motion was transmitted to the shaft 4; but by shifting the rollers the transmitting-gear is set in action, so that the apex of the driving-cone communicates with the base of the driven cone, and the latter turns at its lowest speed. After this the speed or ratio of transmission may be varied in the well-known manner. When the transmitting mechanism is started, the forked arms 8 will at first be above their mid-position, Fig. 2, because at the point of contact the circumference of the driven cone is greater than that of the driving-cone, and the rod or screw-spindle containing the axis of the forked arms being parallel to the axis of the cones will be nearer to the point of contact of the driven cone. In proportion as the speed is increased the forked arms are lowered until the mean velocity has been reached. If the wheels are caused to advance farther along the cones, the forked arms will incline in the opposite direction.

It is easy to understand that the arrangement described above completely obviates the usual defects of this kind of transmission-gear. The diameter of the rollers may have any desired dimension, whereby the working of the transmission-gear is much improved. Moreover, the number of contact-points has been doubled, and the length of the contacts obtained by means of the elastic rims may be chosen at will. It will also be understood that the apparatus heretofore described may be used indifferently and without any modification either for a friction-gear or for a belt-transmitting gear, the elastic rims being in the first case applied directly to the rollers and in the second case constituted by a suitable belt passing around and pressed against the cones or regulated in its tension by aid of the rollers. It is also evident that the same apparatus may be used without any modification in the case where the cones instead of being shaped as uninterrupted cones would be shaped in the form of stepped cones, which are, in fact, quite identical to "cones" properly so called.

What I claim is—

1. In mechanism for transmitting motion by means of cones, two opposite cones having parallel axes, a roller adapted to transmit motion from one of the said cones to the other, an axle supporting the said roller, a forked arm carrying the said axle, a rod whose axis is situated in the plane containing the axes of the cones, and placed parallel to the said axes, the said forked arm being adapted to turn on said rod and to move along the same, substantially as described and for the purpose specified.

2. In mechanism for transmitting motion by means of cones, two opposite cones having parallel axes, two opposite rollers adapted to transmit motion from one of the said cones to the other, an axle for each of the said rollers, movable forked arms carrying these axles, a rod whose axis is placed parallel to the axes of the cones in the plane containing the said axes, the said forked arms being adapted to turn on the said rod and to move along the same, substantially as described and for the purpose specified.

3. In mechanism for transmitting motion by means of cones, two opposite cones having parallel axes, two rollers mounted on axles parallel to the plane containing the axes of the cones, and arranged symmetrically to the said plane, movable forked arms carrying these axles, a common rod on which these forked arms are adapted to turn and also to move longitudinally, the axis of said rod being placed parallel to the axes of the cones and situated in the plane containing the said axes, substantially as described and for the purpose specified.

4. In mechanism for transmitting motion by means of cones, two opposite cones having parallel axes, two rollers arranged symmetrically against the said cones, axles placed parallel to the plane containing the axes of the cones and arranged symmetrically to the said plane, the said parallel axles carrying said rollers, forked arms supporting the axles of these rollers, means for varying the length of these forked arms and regulating the pressure of the rollers, and a common rod on which the said forked arms are capable of turning and also of moving longitudinally, the axis of said rod being placed parallel to the axes of the cones and situated in the plane containing these axes, substantially as described and for the purpose specified.

5. In mechanism for transmitting motion by means of cones, two opposite cones having parallel axes, two rollers arranged symmetrically against the said cones, axles placed parallel to the plane containing the axes of the cones and symmetrically to the said plane, the said axles supporting the rollers, elastic rims for the said rollers, forked arms holding the axles of the rollers, means for varying the length of these forked arms and for regulating the pressure of the rollers on the cones, and a common rod on which these forked arms are adapted to turn and to move longitudinally, the axis of said rod being placed parallel to the axes of the cones in the plane containing the said axes, substantially as described and for the purpose specified.

In witness whereof I have hereunto set my hand in presence of two witnesses.

ANTOINE JANSSENS.

Witnesses:
GEORG BEDE,
GREGORY PHELAN.